United States Patent [19]
Danis

[11] 3,815,575
[45] June 11, 1974

[54] COOKING UTENSIL
[76] Inventor: Louis J. Danis, 522 E. Minges Rd., Battle Creek, Mich. 49015
[22] Filed: Feb. 27, 1973
[21] Appl. No.: 336,271

Related U.S. Application Data
[63] Continuation-in-part of Ser. No. 209,121, Dec. 17, 1971, abandoned.

[52] U.S. Cl................ 126/390, 165/105, 165/104, 219/439
[51] Int. Cl. ........................................ A47j 27/024
[58] Field of Search................... 126/377, 378, 390; 165/105, 104; 219/430, 439, 326, 530

[56] References Cited
UNITED STATES PATENTS
| | | | |
|---|---|---|---|
| 1,528,494 | 3/1925 | Lennig | 219/341 |
| 3,603,767 | 9/1971 | Scicchitano | 165/105 X |
| 3,651,861 | 3/1972 | Devring | 165/168 X |

FOREIGN PATENTS OR APPLICATIONS
| | | | |
|---|---|---|---|
| 1,309,415 | 10/1962 | France | 126/378 |
| 232,352 | 5/1944 | Switzerland | 126/377 |
| 162,695 | 7/1933 | Switzerland | 126/390 |

*Primary Examiner*—William F. O'Dea
*Assistant Examiner*—William C. Anderson
*Attorney, Agent, or Firm*—Roger A. Johnston

[57] ABSTRACT

A utensil, or appliance, having a cooking surface in which the heat output area remains substantially isothermal during cooking of substances thereon while portions of the device are heated. The device has a suitably disposed hollow chamber intermediate the heated portions and the cooking surface, which chamber contains a first nonvaporizing liquid of high boiling point, preferably above 500° F. Sealed tube means is disposed in said first liquid and contains a second vaporizable liquid having a boiling point less than 250° F. The volume of the high boiling liquid is reduced by filling with hollow spheres of negligible specific heat. The boiling and condensation of the second liquid during cooling improve rate of heat conductivity from the heated portion to the cooking surface.

9 Claims, 4 Drawing Figures

PATENTED JUN 11 1974 3,815,575

COOKING UTENSIL

This invention relates specifically to a utensil, or appliance, having an isothermal cooking surface, and is a continuation-in-part of U.S. application Ser. No. 209,121, filed Dec. 17, 1971, and now abandoned.

BACKGROUND OF THE INVENTION

The present invention utilizes the isothermal effect of a vaporizing and condensing liquid in a single cavity, but eliminates the potential hazard and design problem of containing fluid having excessive internal pressure by avoiding any relatively high pressure vapor in direct contact with the functioning surfaces of the utensil.

Devices known as heat pipes to provide temperature equilization from a concentrated heat source have been widely disclosed in the prior art. The use of a porous wick capillary for return of working fluid in many of these devices has, in many cases, limited rather than enhanced the heat transfer capabilities of simple domestic appliances, such as griddles and fry pans.

Alternatively, when the wick is eliminated from a vapor-liquid heat transfer device, larger amounts of working fluid are cycled and more heat is transported. However, entrainment of liquid particles may occur, and the attendant high internal pressures may pose structural stress problems even though the working liquid otherwise has optimized stability, latent heat, and speed of response. In cooking utensils, for example, water has excellent properties as working fluid, except for a steep pressure-temperature curve, in the most desirable cooking temperature range of 200° to 550° F.

Since it is essential that units intended for domestic cooking use be constructed for total safety, it has been desirable to provide a vapor-liquid heated utensil that did not require the containment of fluids at high pressures in such a manner as to subject the utensil or appliance to high stresses.

SUMMARY OF THE INVENTION

The present invention provides a solution to the above-described problem by incorporating a novel vapor-liquid heating cavity in a cooking utensil for transferring heat from the heated to the cooking portions of the utensil. The cavity is partially filled with a liquid having a boiling point higher than the highest desired temperature of the cooking surface. A plurality of hollow spheres are immersed in the fluid to reduce the amount of liquid required and thus the weight of the utensils. A preferably serpentine shaped tube is immersed in the liquid within the cavity. The tube has a fluid pressure sealed interior which is partially filled with a vaporizable liquid, preferably water, having a suitable latent heat of vaporization and a boiling point less than the lowest desired temperature of the cooking surface. The tubing provides a small volume, efficient and simple but safe pressure vessel. The water, the water vapor within the tube, and the tube per se in cooperation with the surrounding high boiling point liquid provides a liquid heat transfer medium from the heated portions to the cooking surface of the utensil.

DETAILED DESCRIPTION

Figure 1:
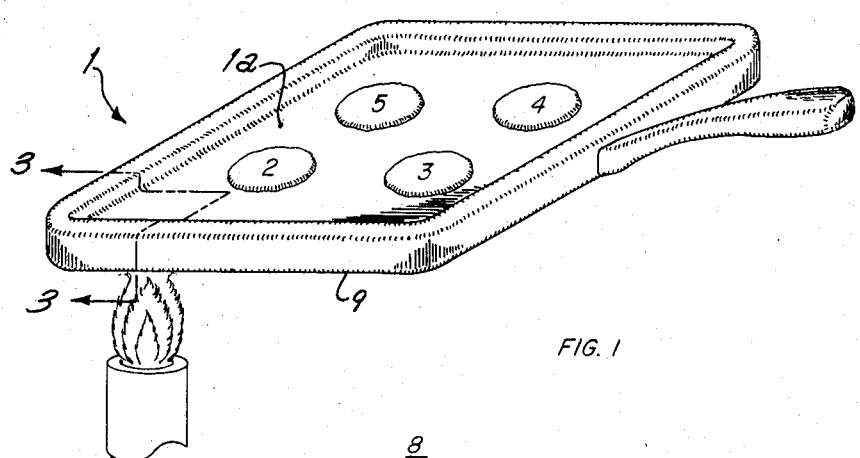
FIG. 1 is a perspective view of the utensil showing the heated portions and the cooking surface.
Figure 3:
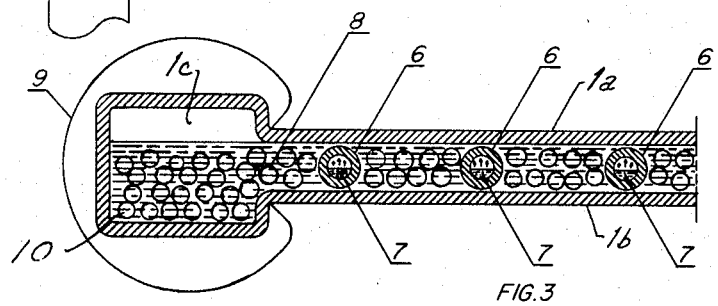
FIG. 3 is a sectional view taken along section-indicating lines 3—3 of FIG. 1 and FIG. 2.
Figure 2:
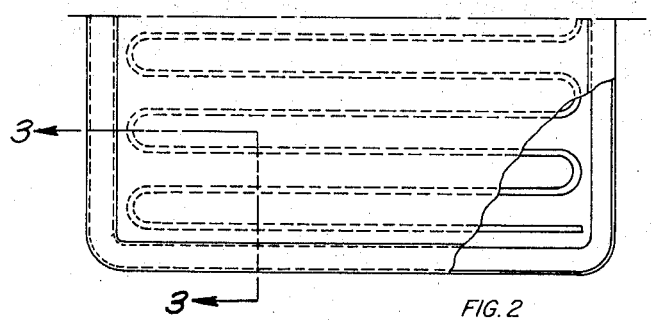
FIG. 2 is a portion of a top view of the utensil of FIG. 1.

Referring to FIGS. 1, 2 and 3 of the drawings, the cooking utensil or appliance of the present invention is shown in the presently preferred form as a frying pan 1 having a heat-receiving undersurface 1b and a cooking surface 1a shown with typical food substances 2, 3, 4 and 5 situated thereon. The pan 1, preferably has an enlarged rim 9 around its perimeter. The pan 1 has a sealed cavity 1c therein which extends throughout the rim 9, and extends intermediate the heat receiving surface 1b and the cooking surface 1a. In the preferred form of the pan 1, the hollow rim 9 may extend below the central portion of heat receiving surface 1b to recess the central region to permit the rim 9 to rest on a range top. Alternatively, the bottom of rim 9 may serve as the heat receiving surface. The cavity 1c is partially filled with a primary working fluid 8, having a boiling point in excess of the maximum desired temperature of the cooking surface 1a. In the presently preferred practice of the invention, the working fluid has a boiling point not lower than 500° F. The preferred pan 1 is formed of a thin shell of corrosion resistant metal, as for example, type 304 stainless steel and the working fluid 8 is a silicone fluid, but it will be apparent that other suitable fluids having the desired boiling point may be used. The preferred pan has a square cooking surface 1a measuring 12 inches along one side of the square.

Disposed within the cavity 1c, intermediate the heated surface 1b and the cooking surface 1a, and immersed in the primary working fluid 8, is a relatively small diameter tube 6 having the interior thereof sealed in a fluid-pressure retaining manner. The tubing 6 preferably has a serpentine or undulating configuration as shown in FIG. 2. The tubing 6 is partially filled with a vaporizable secondary liquid 7, having a suitable, relatively high, latent heat of vaporization and a boiling point not higher than 250° F. In the presently preferred practice, water is used for the liquid 7; however, other suitable fluids are ethylene glycol, methyl alcohol and mixtures of water with methyl alcohol or with ethylene glycol. The tubing 6 has preferably an outside diameter of 3/10 inch and a wall thickness of substantially .022 inches and is formed of a corrosion resistant metal such as type 304 stainless steel. However, other suitable metals may be used where convenient. For the above mentioned 12 inches × 12 inches pan, the tubing 6 has a preferred length of substantially 144 inches or 12 feet. Tubing in accordance with the above characteristics will withstand 35,000 p.s.i. allowable wall stress for $1 \times 10^7$ cycles of heating and cooling to room temperature which is more than adequate for a utensil to be used three times a day. Where water is used as the vaporizable liquid 7, a tubing wall stress of only 10,000 p.s.i. will be experienced and thus an adequate safety margin is provided.

In operation, as the under surface 1b is heated, the working liquid 8 is heated and transfers heat to the tubing 6. The tubing causes the vaporizable liquid 7 to boil and condense on the inside of the upper portion of the tubing 7. This condensation transfer heat at a greater rate to the upper portion of the tubing 7 than does the working liquid 8. Therefore the tubing 7 actually transfers heat to the working liquid 8 in the upper regions thereof adjacent the cooking surface 1a. The boiling-condensing liquid 8 within the tubing 6 thus transfers heat from the heated surface 1b to cooking surface 1a faster than the working fluid 8 alone. As mentioned above, a plurality of hollow spheres 10 are immersed in the working fluid 8, to reduce the required value of the fluid and thus the weight of the utensil. The spheres may be made of glass, corrosion resistant metal, or other suitable material.

Figure 4:
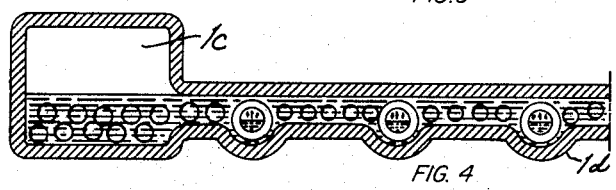
FIG. 4 is a view similar to FIG. 3, and illustrates another embodiment of the invention.

FIG. 4 shows another embodiment of the frying pan 1, having the heated undersurface contoured with convex-concave ridges to more closely fit the configuration of the tubing 7 and further aid in reducing the volume of working fluid 8 required.

Although the invention has been shown embodied in a frying pan, other forms will be readily apparent, as for example, griddles, waffle irons, range tops and oven walls. The present invention thus provides a novel cooking utensil or appliance having a primary high boiling point working fluid intermediate the heated and cooking surfaces. The primary working fluid is aided by tubing immersed therein, the tubing having a vaporizable, low boiling point secondary liquid which transfers heat more rapidly by virtue of its condensation within the tubing, to the region of the primary fluid adjacent the cooking surface.

Modifications and variations of the invention will be apparent to those having ordinary skill in the art and the invention is limited only by the following claims

I claim:

1. A cooking utensil characterized in that said utensil has,
   a. a cooking surface,
   b. a heating surface adapted to receive heat from a source thereof,
   c. a sealed cavity formed therein, said cavity being disposed intermediate said cooking surface and said heating surface, said cavity being partially filled with a first liquid having a boiling point in excess of any desired predetermined maximum cooking temperature such that said liquid does not boil during heating and cooking;
   d. a plurality of hollow spheres disposed in said cavity and immersed in said first liquid;
   e. tube means disposed in said cavity and immersed in said liquid, said tube means having the interior thereof sealed and partially filled with a second liquid having a boiling point substantially less than the desired cooking surface temperature such that said second liquid boils and condenses during heating and cooking.

2. The utensil defined in claim 1 wherein said first liquid is a silicone liquid.

3. The utensil defined in claim 1, wherein said second fluid is one of the group consisting of water, methyl alcohol, ethylene glycol, a mixture of glycol and water and a mixture of methyl alchol and water.

4. The utensil defined in claim 1 wherein said hollow spheres are formed of glass material.

5. The utensil defined in claim 1, wherein said hollow spheres are formed of corrosion resistant metal.

6. The utensil defined in claim 1, wherein said first liquid has a boiling point not lower than 500° F.

7. A cooking appliance characterized in that said appliance has:
   a. a heat dispensing surface;
   b. a heated surface adapted to receive heat from a source of heat;
   c. a sealed cavity formed therein and disposed intermediate said heat dispensing surface and said heating surface, said cavity being partially filled with a first liquid having a boiling point in excess of any desired predetermined maximum cooling temperature, such that said liquid does not boil during heating and cooking;
   d. a plurality of hollow spheres disposed in said cavity and immersed in said first liquid;
   e. tube means disposed in said cavity and immersed in said first liquid, said tube means having the interior thereof sealed and partially filled with a second liquid having a boiling point substantially less than the desired cooking surface temperature such that said second liquid boils and condenses during heating and cooking.

8. The appliance defined in claim 7, wherein said primary working liquid is a silicone liquid and said secondary liquid is one of the group consisting of water, ethylene glycol, a mixture of water and ethylene glycol, methyl alcohol or a mixture of water and methyl alcohol.

9. The appliance defined in claim 7 wherein said primary liquid has a boiling point not less than 500° F and said secondary liquid has a boiling point less than 250° F.

* * * * *